US012763524B2

(12) United States Patent
Liu et al.

(10) Patent No.: US 12,763,524 B2
(45) Date of Patent: Oct. 13, 2026

(54) ELECTRICAL CONNECTOR WITH AN IMPROVED GROUNDING MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Jia-Hau Liu, New Taipei (TW); Qin-Xin Cao, Kunshan (CN); Tsu-Yang Wu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 282 days.

(21) Appl. No.: 18/612,078

(22) Filed: Mar. 21, 2024

(65) Prior Publication Data

US 2024/0322494 A1 Sep. 26, 2024

(30) Foreign Application Priority Data

Mar. 24, 2023 (CN) ......................... 202310300498.2

(51) Int. Cl.
*H01R 13/658* (2011.01)
*H01R 13/6461* (2011.01)
(Continued)

(52) U.S. Cl.
CPC ..... *H01R 13/6585* (2013.01); *H01R 13/6461* (2013.01); *H01R 13/6471* (2013.01); *H01R 13/6581* (2013.01)

(58) Field of Classification Search
CPC .... H01R 12/724; H01R 12/73; H01R 12/716; H01R 13/6585; H01R 13/6597; H01R 13/6461; H01R 13/6471
(Continued)

(56) References Cited

U.S. PATENT DOCUMENTS 8,764,464 B2 7/2014 Buck
9,647,395 B2 * 5/2017 Hsu ...................... H01R 13/405
(Continued)

FOREIGN PATENT DOCUMENTS

CN 206283050 U 6/2017
CN 207572652 U 7/2018
(Continued)

*Primary Examiner* — Marcus E Harcum
(74) *Attorney, Agent, or Firm* — Ming Chieh Chang

(57) ABSTRACT

An electrical connector includes: a housing defining a longitudinal direction; a row of first terminals being retained in the housing and having plural pairs of signal terminals and plural grounding terminals; a row of second terminals retained in the housing opposite to the row of the first terminals; and a first grounding member retained in the housing, wherein the first grounding member has a longitudinal ridge, plural shielding portions, and plural grounding tails extending from the longitudinal ridge, the shielding portions face and shield corresponding pairs of signal terminals of the row of first terminals, respectively, spanning from a rear end to a front end of corresponding signal terminals, and the grounding tails contact corresponding grounding terminals of the row of first terminals, respectively.

8 Claims, 17 Drawing Sheets

(51) Int. Cl.
*H01R 13/6471* (2011.01)
*H01R 13/6581* (2011.01)
*H01R 13/6585* (2011.01)

(58) Field of Classification Search
USPC ................................ 439/92, 607.05, 607.34
See application file for complete search history.

(56) References Cited

U.S. PATENT DOCUMENTS

| | | | | |
|---|---|---|---|---|
| 9,653,849 | B2 * | 5/2017 | Hsu | H01R 13/405 |
| 9,716,326 | B2 * | 7/2017 | Tamai | H01R 12/73 |
| 9,985,358 | B2 * | 5/2018 | Zhu | H01R 12/778 |
| 10,581,201 | B2 | 3/2020 | Foxconn | |
| 11,050,193 | B2 * | 6/2021 | Brennauer | H01R 12/724 |
| 11,381,039 | B2 | 7/2022 | Foxconn | |
| 2009/0149042 | A1 * | 6/2009 | Hsu | H01R 13/6593<br>439/67 |
| 2014/0004744 | A1 | 1/2014 | Hsu et al. | |
| 2018/0013240 | A1 * | 1/2018 | Takeuchi | H01R 13/05 |
| 2020/0076131 | A1 * | 3/2020 | Hu | H01R 12/737 |
| 2021/0234291 | A1 * | 7/2021 | Zerebilov | H01R 12/53 |
| 2021/0265784 | A1 * | 8/2021 | Hsiao | H01R 24/62 |
| 2023/0050934 | A1 | 2/2023 | Yin et al. | |
| 2023/0058246 | A1 * | 2/2023 | Liong | H01R 12/737 |
| 2023/0170649 | A1 | 6/2023 | Foxconn | |
| 2023/0387634 | A1 | 11/2023 | Amphenol | |
| 2024/0162663 | A1 * | 5/2024 | Yang | H01R 13/424 |
| 2024/0178620 | A1 * | 5/2024 | Li | H01R 13/514 |
| 2025/0030205 | A1 * | 1/2025 | Liu | H01R 12/737 |

FOREIGN PATENT DOCUMENTS

| | | | | | |
|---|---|---|---|---|---|
| CN | 208904327 | U | | 5/2019 | |
| CN | 208955231 | U | | 6/2019 | |
| CN | 209045918 | U | | 6/2019 | |
| CN | 109962356 | A | * | 7/2019 | H01R 12/716 |
| CN | 113314869 | A | * | 8/2021 | H01R 13/648 |
| CN | 215955609 | U | * | 3/2022 | |
| TW | I722581 | B | | 3/2021 | |
| TW | 202310517 | A | | 3/2023 | |

* cited by examiner

ELECTRICAL CONNECTOR WITH AN IMPROVED GROUNDING MEMBER

BACKGROUND OF THE INVENTION

Field of the Invention

The present invention relates to an electrical connector which transmits high frequency signal.

Description of Related Arts

U.S. Publication No. 2023/0170649 discloses an electrical connector with a plurality of grounding members, each of the grounding members having a front bar, a rear bar, and plural bridges between the front bar and the rear bar. A plurality of grounding fingers extend from the front bar, the rear bar or the bridges for electrically connecting with ground terminals.

Therefore, it is desired to provide an electrical connector with an improved grounding member.

SUMMARY OF THE INVENTION

An object of the present invention is to provide an electrical connector with an improved grounding member.

To achieve the above object, an electrical connector comprises a longitudinal housing defining a longitudinal direction; a row of first terminals being retained in the housing and comprising plural pairs of signal terminals and plural grounding terminals; a row of second terminals retained in the housing opposite to the row of the first terminals; and a first grounding member retained in the housing, wherein the first grounding member comprises a longitudinal ridge extending in the longitudinal direction, a plurality of shielding portions, and a plurality of grounding tails extending from the longitudinal ridge, the shielding portions face and shield corresponding pairs of signal terminals of the row of first terminals, respectively, spanning from a rear end to a front end of corresponding signal terminals, and the grounding tails contact corresponding grounding terminals of the row of first terminals, respectively.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
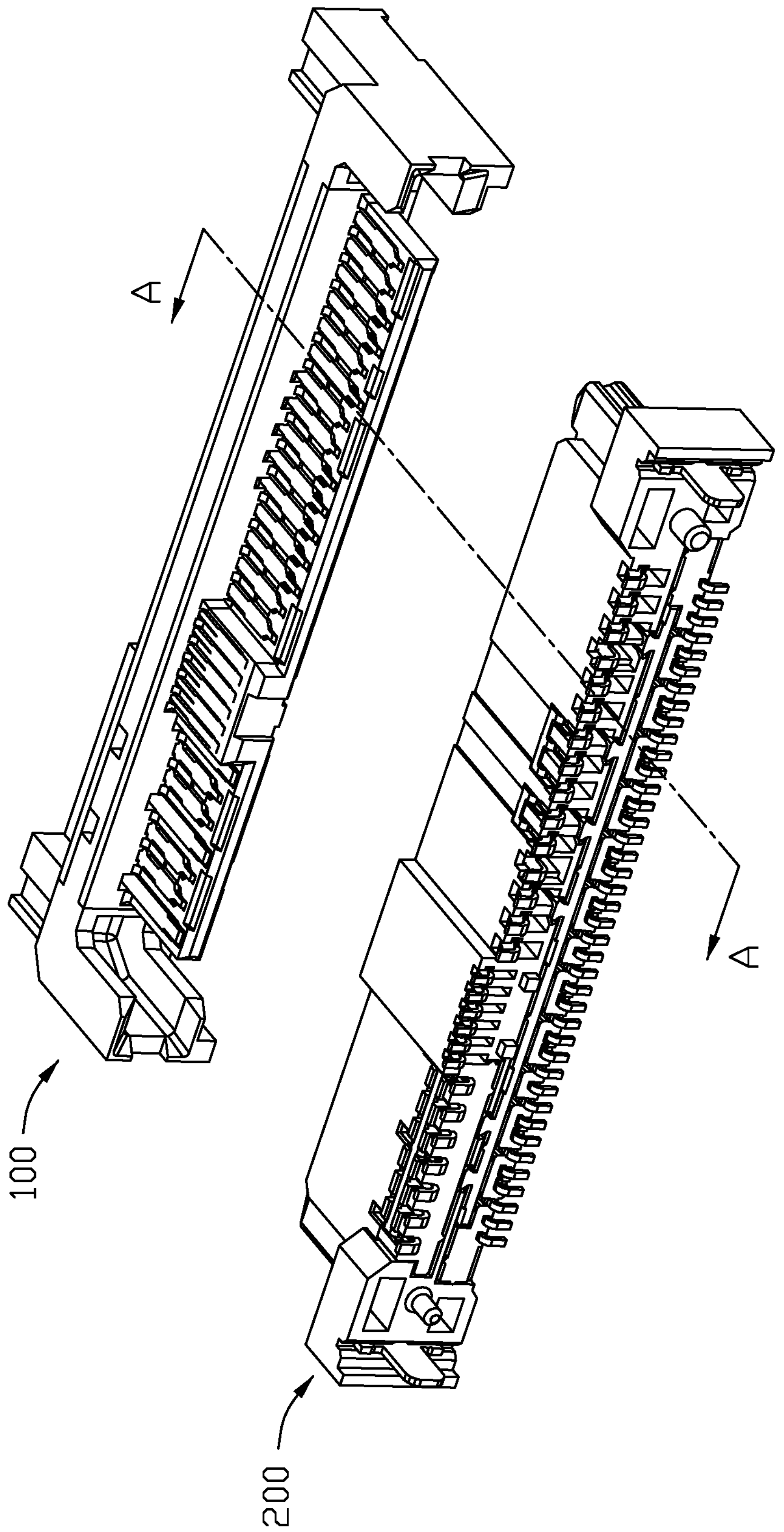
FIG. 1 is a perspective view of a plug connector and a receptacle connector separated from each other.
Figure 2:
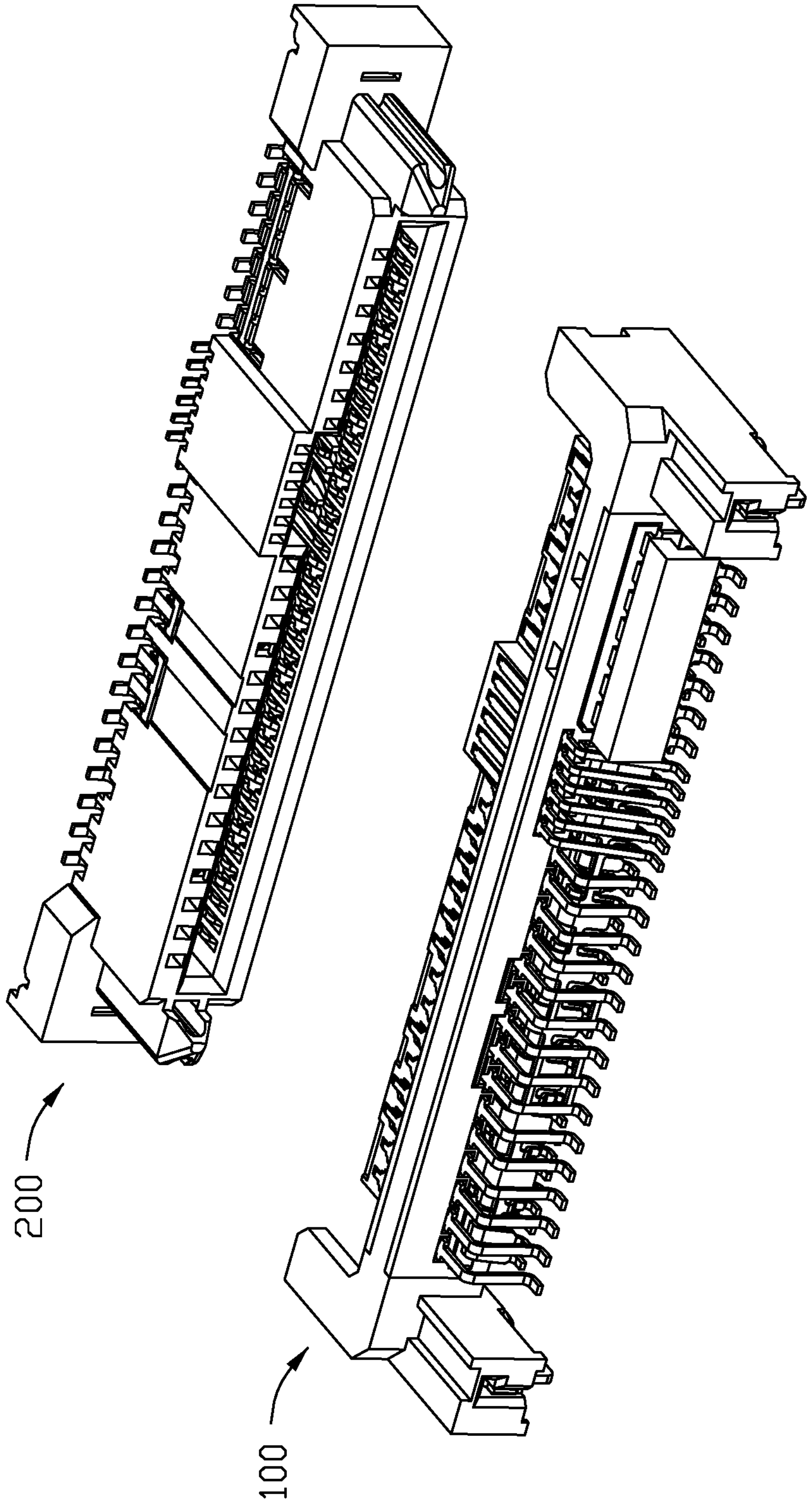
FIG. 2 is another perspective view of the plug connector and the receptacle connector of FIG. 1.

Referring to FIGS. 1-4, an electrical connector assembly with SFF-8639 transmission interface is illustrated, which includes a plug connector 100 and a receptacle connector 200 mated with the plug connector 100. The assembly is adapted for transmitting high speed signals with signal transmission rates above 32 GT/s and transmission bandwidth up to 128 GB/s. The assembly can be applied to the latest generation PCIe 5.0 transmission protocol.

For convenience, a mating end of the plug connector 100 or the receptacle connector 200 is defined as a front end.

Referring to FIGS. 5-8, the plug connector 100 includes a longitudinal housing 1 made from insulating material, a row of first/lower terminals 21, a row of second/upper terminals 22 and a first grounding member 3, the first terminals 21 and the second terminals 22 are retained on two opposite sides of the housing 1 respectively, and the first grounding member 3 is at one side of the first terminals 21. The housing 1 includes a base portion 11, and a tongue portion 12 extending forward from the base portion and with an upper face 121 and a lower face 122. The upper face 121 is provided with a key 1210. Each of the first terminal 21 and the second terminal 22 have a flat portion, the flat portion of the first terminal 21 is located on the lower face 122 of the tongue portion 12 and the flat portion of the second terminal 22 is located on the upper face 121 of the tongue portion 12. The row of the first terminals 21 includes plural pairs of signal terminals 21S and plural grounding terminals 21G. Combining with FIG. 3, each of the first terminal 21 and second terminal 22 comprises a fixing portion 201 fixed in the base portion 11, the flat portion 202 extending forward from the fixing portion 201 and the tail portion 203 extending backwards from the fixing portion 201. The tail portion 203 comprises a connecting portion 204 extending downwardly from the fixing portion 201 and a soldering portion 205 extending horizontally backward from the fixing portion 201. The housing 1 comprises a first insulating part/an insulating bar 111. The first terminals 21 are molded into the insulating bar 111 firstly to form a first terminal module 210, and then the first terminal module 210 is installed into a main insulating part of the housing 1 composed of the base portion and the tongue portion 12.

Figure 9:
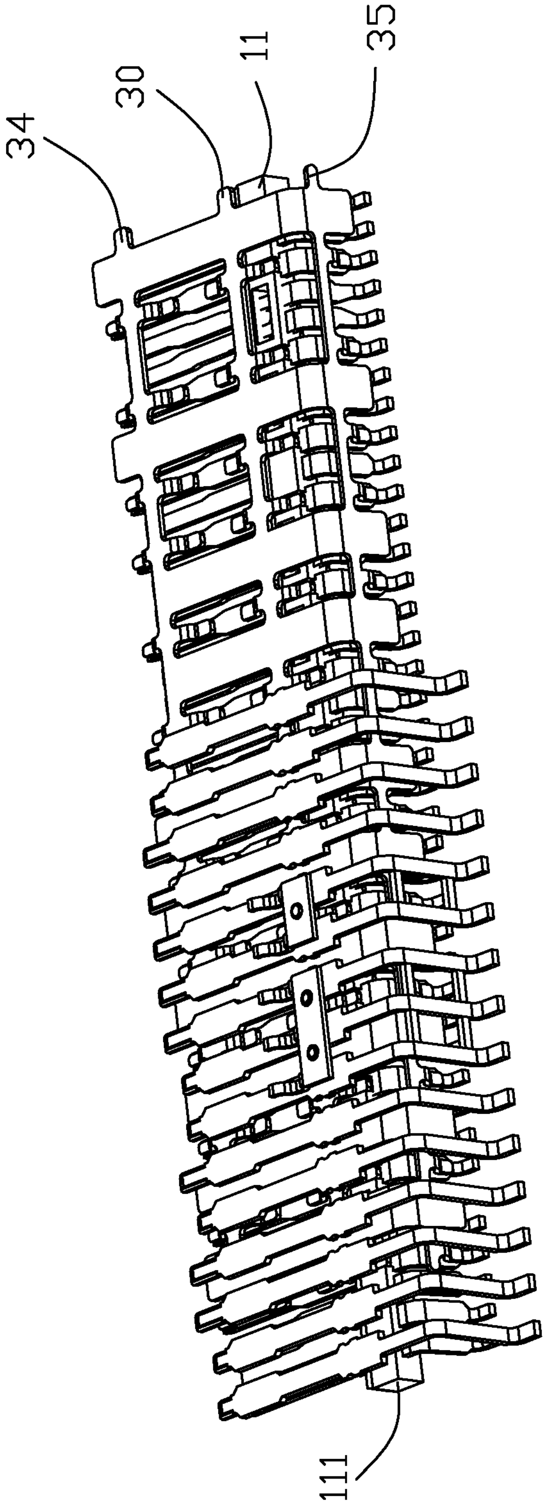
FIG. 9 is a perspective view of the plug connector with the housing and some of the second terminals being removed.
Figure 10:
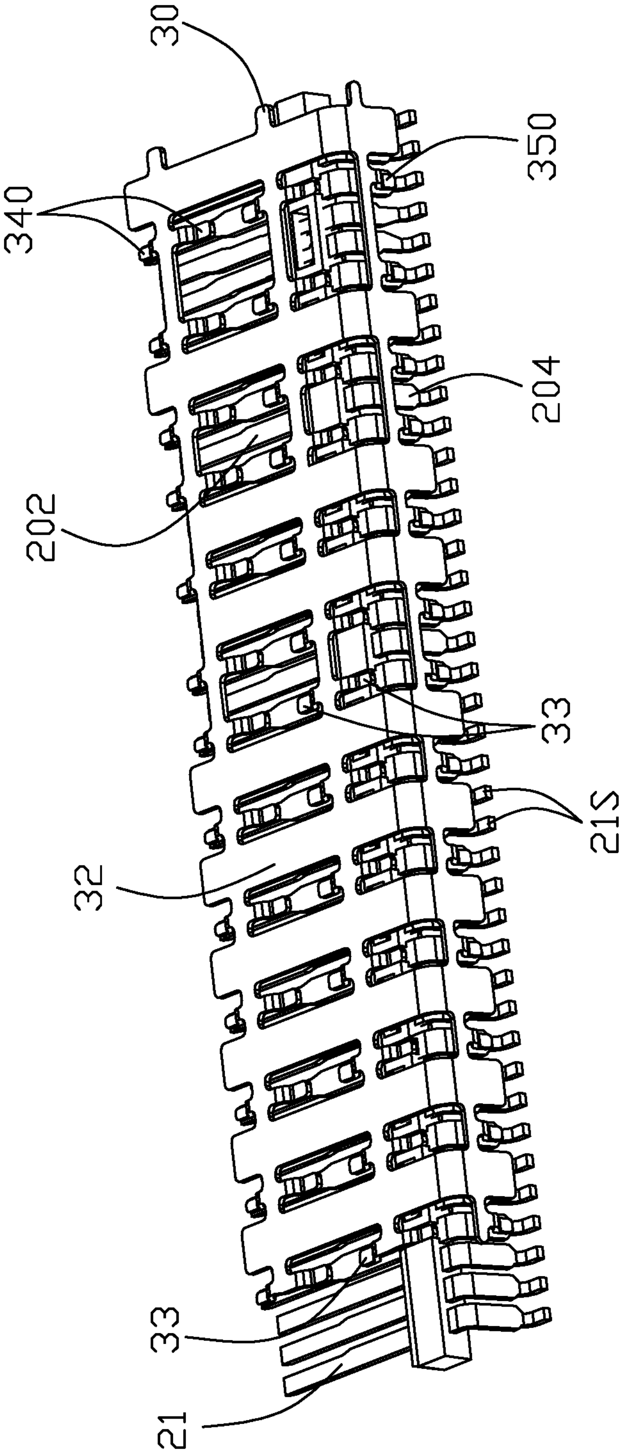
FIG. 10 is a perspective view of plug connector of FIG. 9 with the second terminals all being removed.
Figure 11:
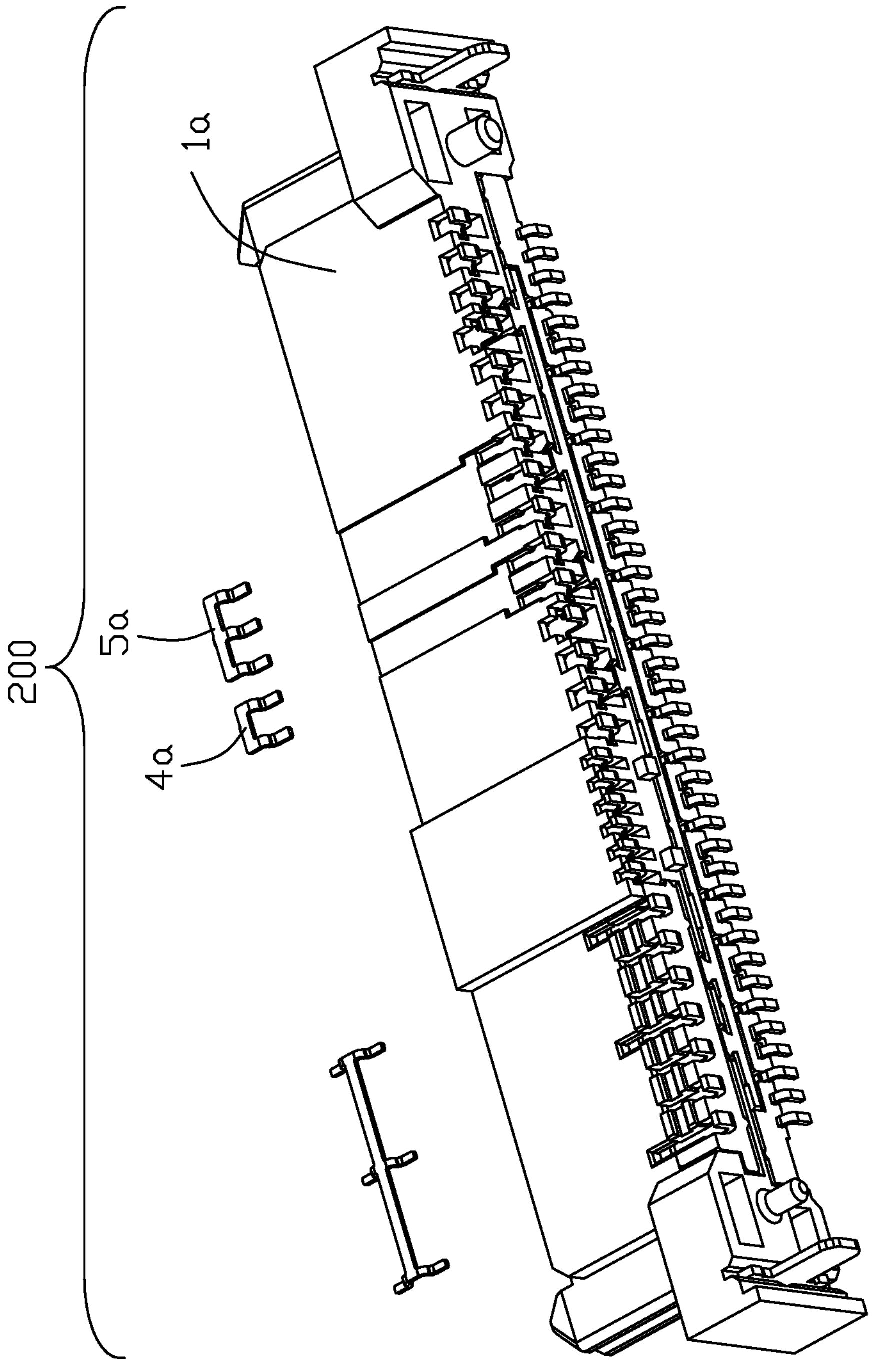
FIG. 11 is an exploded perspective view of the receptacle connector of FIG. 1 with the grounding members for contacting with the second terminals separated from the receptacle connector.
Figure 12:
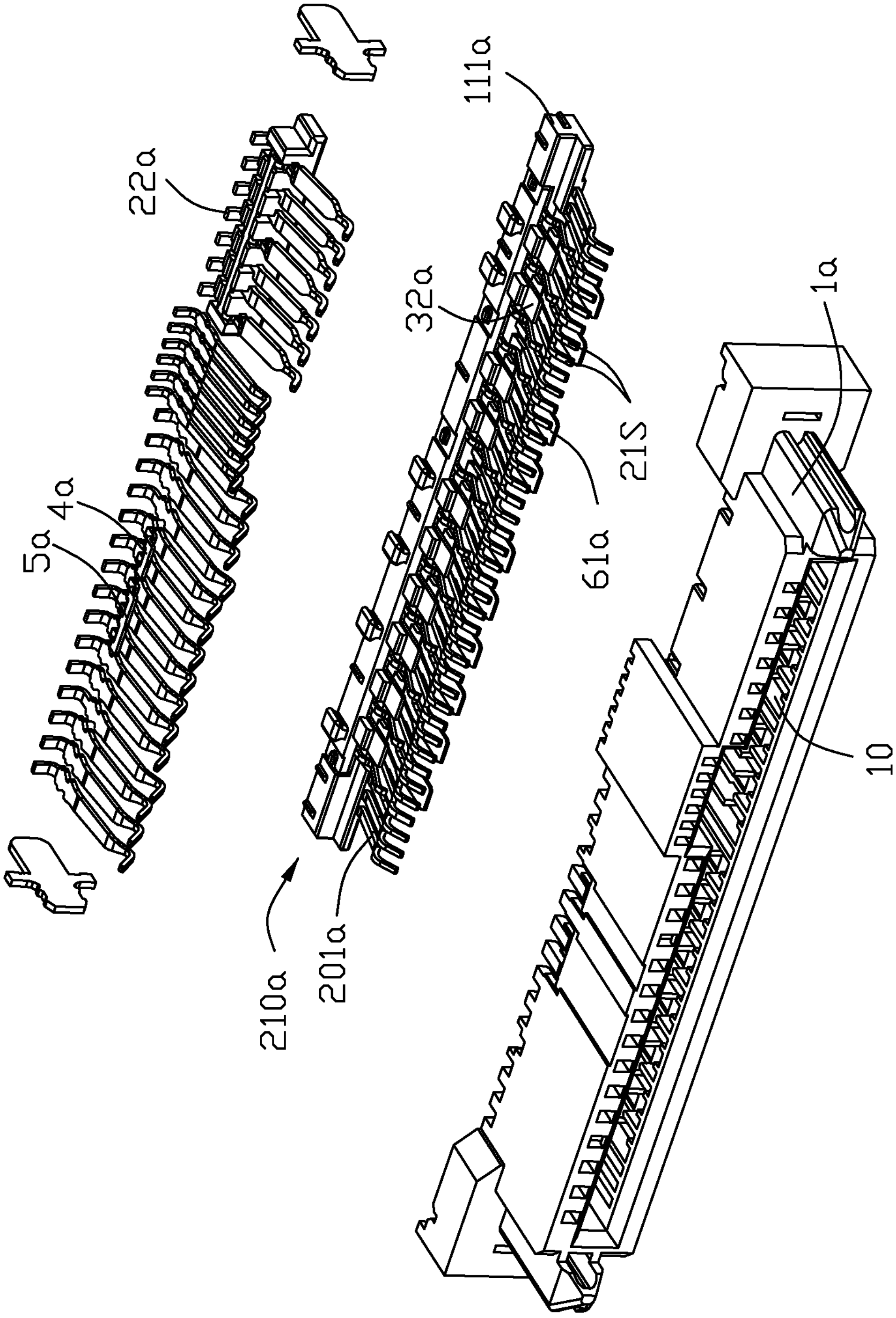
FIG. 12 is a further exploded view of the receptacle connector.
Figure 13:
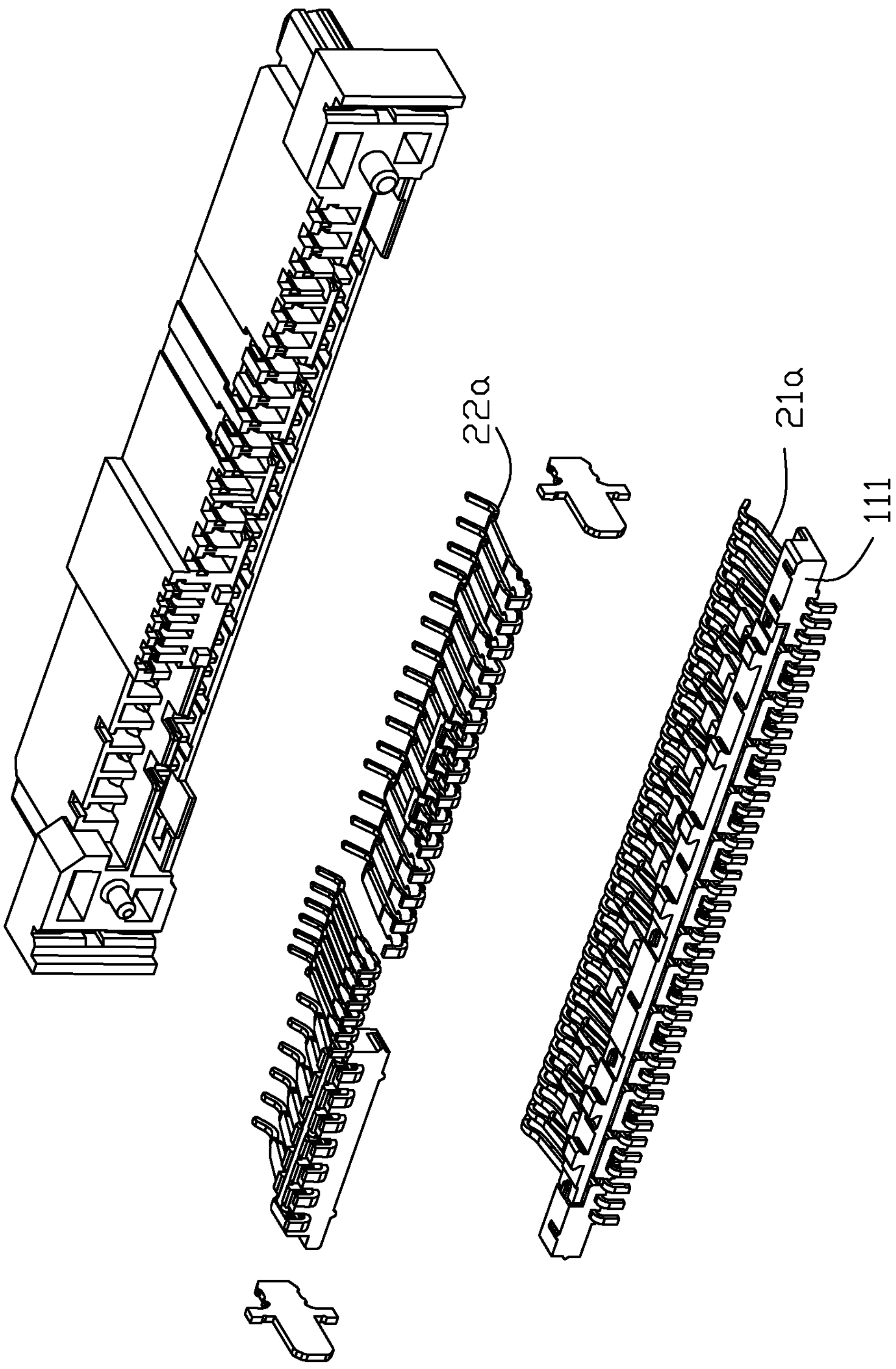
FIG. 13 is another exploded perspective view of the receptacle connector of FIG. 12.
Figure 14:
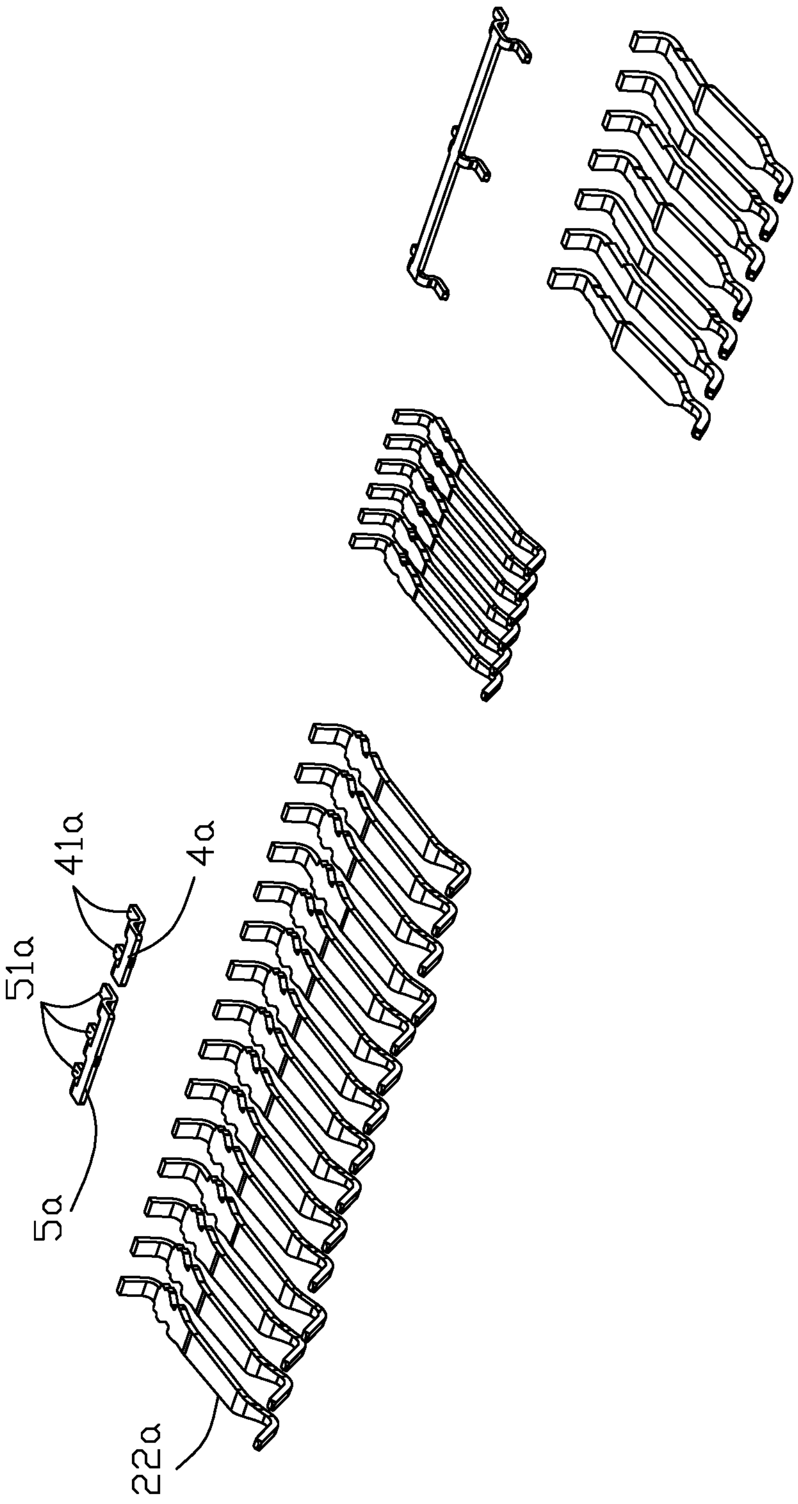
FIG. 14 is a perspective view of the second terminals and the grounding members for contacting with grounding terminals thereof of FIG. 12.
Figure 15:
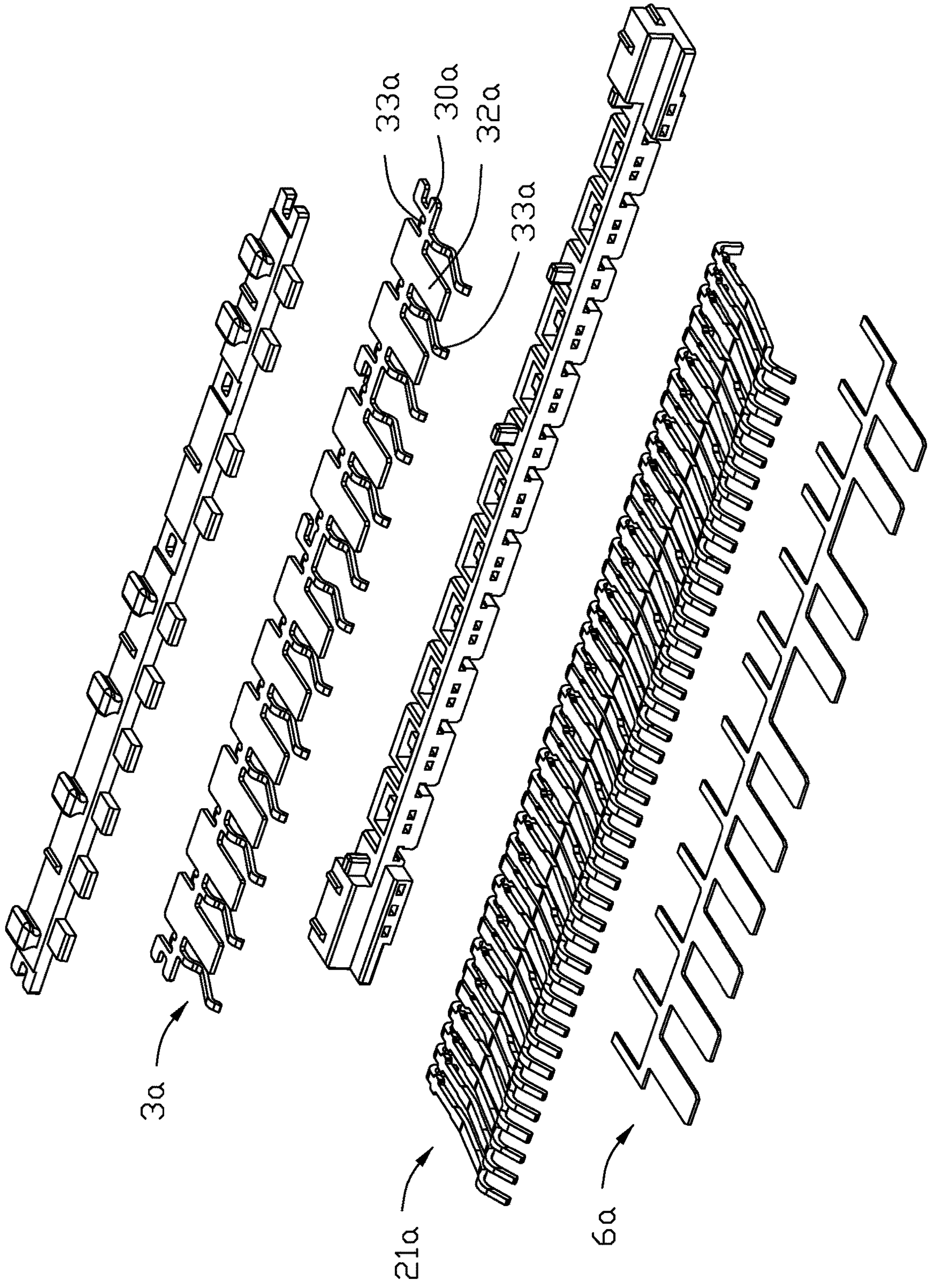
FIG. 15 is an exploded view of a first terminal module and grounding members for contacting with the grounding terminals thereof.
Figure 16:
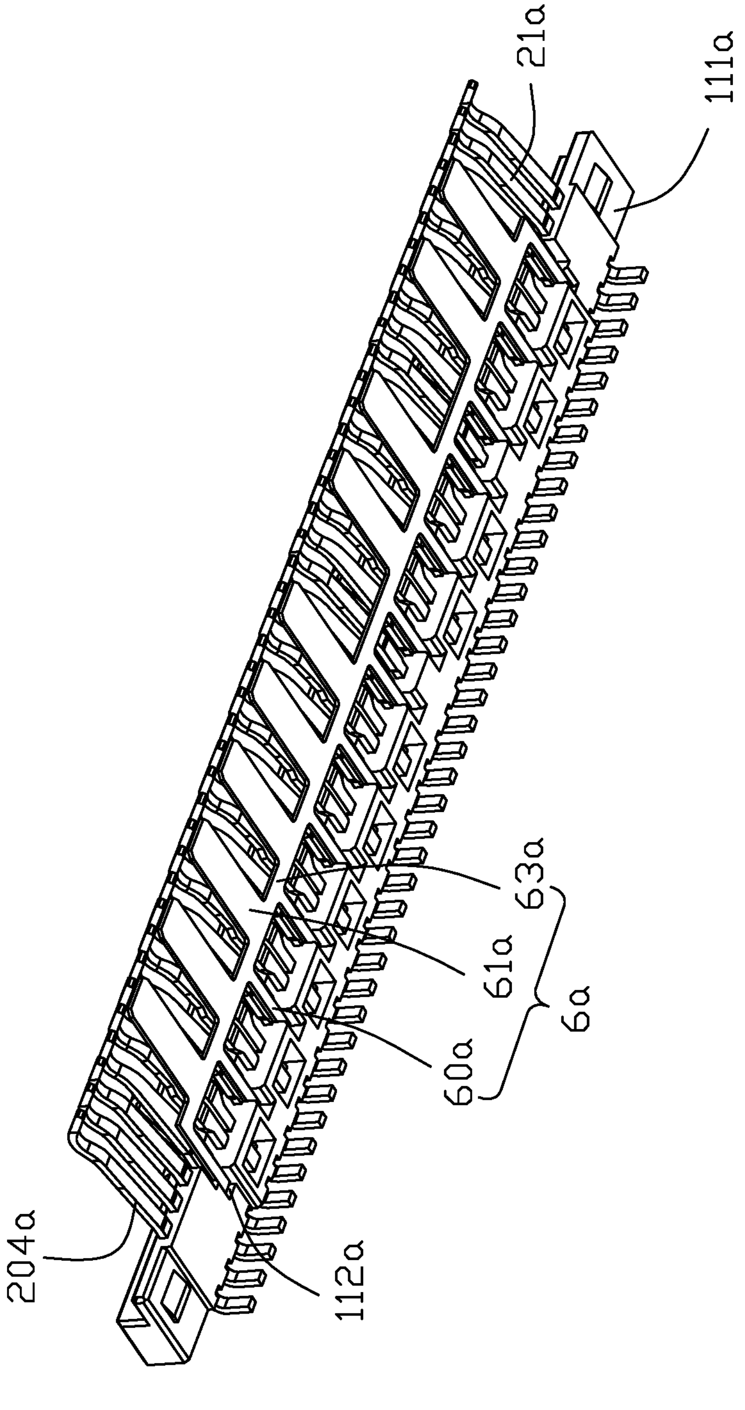
FIG. 16 is a perspective view of the first terminal module and a fourth grounding member thereof.

Referring to FIGS. 9-10, the first grounding member 3 comprises a longitudinal ridge 30, a plurality of shielding portions 32 and a plurality of grounding tails 33 extending from the longitudinal ridges 30. Each shielding portion 32 faces a corresponding pair of signals terminals 21S and span from the connecting portion 204 to the front end of the flat portion 202 of the signal terminals 21S. The first grounding member 3 further comprises a front assistant ridge 34 in front of the longitudinal ridge 30 and a rear assistant ridge 35 behind the longitudinal ridge 30. The first assistant ridge 34 has a plurality of grounding tails 340 and the second assistant ridge 35 has a plurality of grounding tails 350. The longitudinal ridge 30 is retained in the base portion 11, the grounding tails 33 extend from two opposite sides of longitudinal ridge 30 and each grounding terminal 21G is grounded at two points along a lengthwise direction thereof with the first grounding tails 33. That means, the grounding tails 33 include front grounding tail and the rear grounding tail. The grounding ridge 30 is arranged and contact with the grounding terminal 21G within the base portion 11 or adjacent to the base portion 11. The front assistant ridge 34 is located near the front end of the tongue portion 12 and united with the shielding portions 32, the grounding tails 340 extend from two sides of the front assistant ridge 34, thus, the grounding tails 340 can get contact with the front end of the flat portion 202 of the grounding terminal 21G. In addition, the rear assistant ridge 35 is located facing the connecting portion 204 of the first terminals 21 and united with the shielding portions 32, the grounding tails 350 extend from the second assistant ridge 35 downwardly and contact with the connecting portions 204 of the grounding terminals 21G. Thus, all the grounding tails 33, 340, 350 of the longitudinal ridge 33, the front assistant ridge 34 and the rear assistant ridge 35 contacting the same grounding terminal 21G of first terminals 21 extend in a lengthwise direction of corresponding grounding terminal. In the prior art US2023/0170649A, as the bridge is over the signal terminals and the grounding fingers extending thereof is in a direction substantially orthogonal to a lengthwise direction of the grounding terminal/the signal terminal, the grounding finger extending from the bridge gets easily incorrect contact with the signal terminals below the bridge when it goes downwardly to get contact with the corresponding grounding terminal. Compared with that, all the grounding tails 33, 340, 350 extending in a direction along the length of the grounding terminal can be avoided to get contact with the signal terminals when they come to get contact with the grounding terminal 21G.

Figure 3:
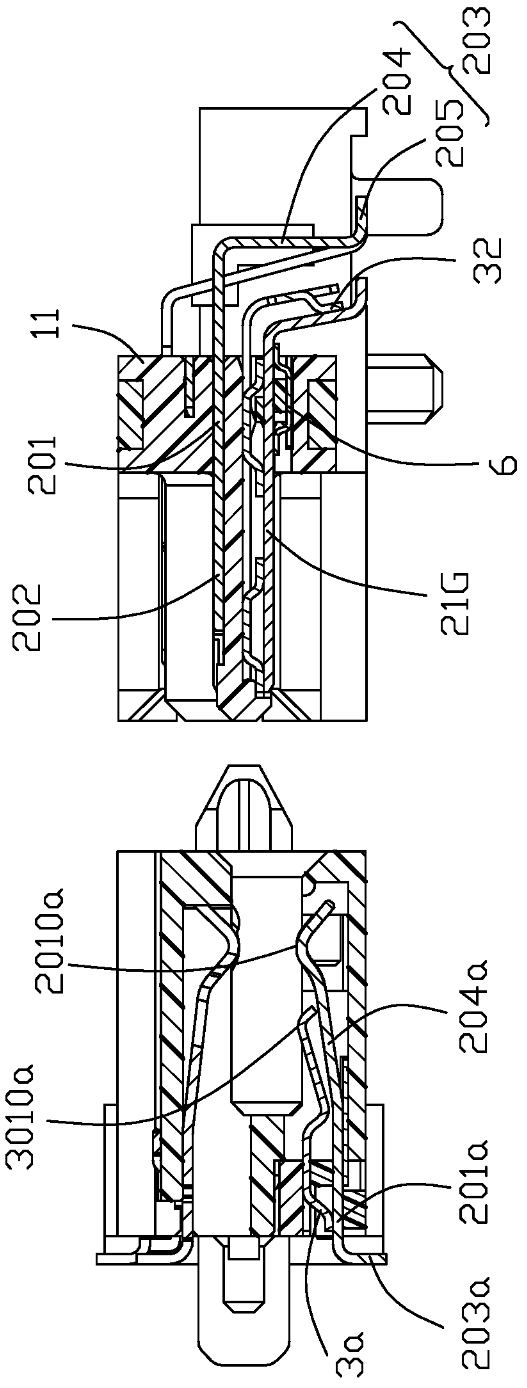
FIG. 3 is a cross-sectional view of the plug connector and the receptacle connector taken along line A-A of FIG. 1.
Figure 4:
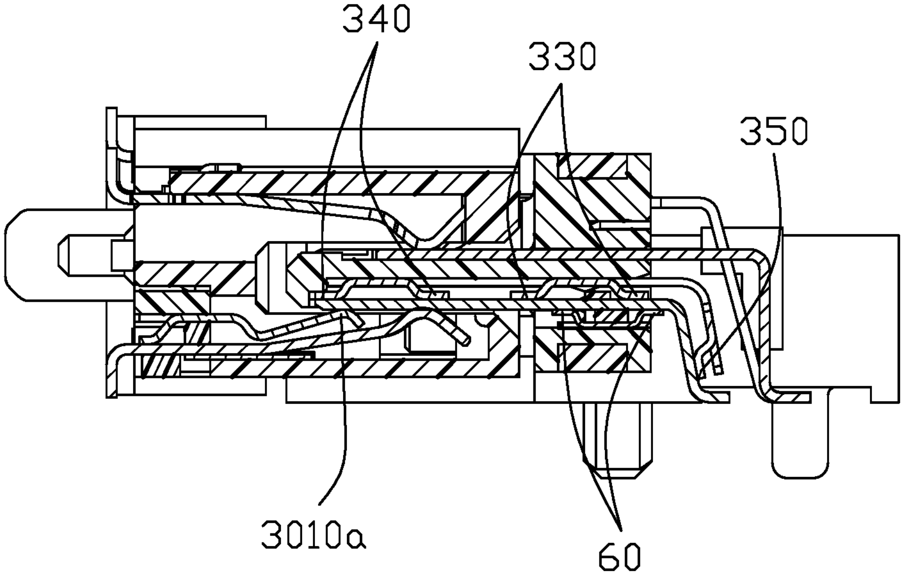
FIG. 4 is a cross-sectional view of the plug connector and the receptacle connector mated with each other.
Figure 5:
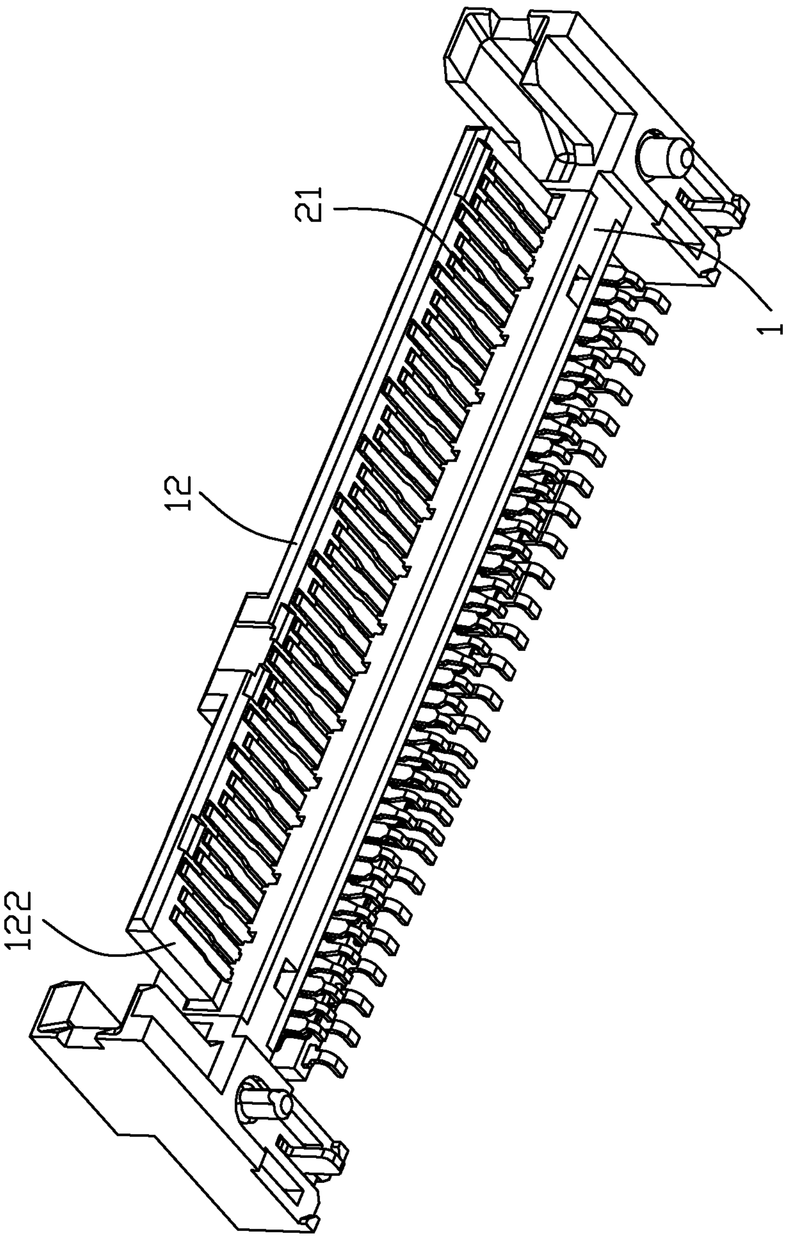
FIG. 5 is another perspective view of the plug connector of FIG. 1.
Figure 6:
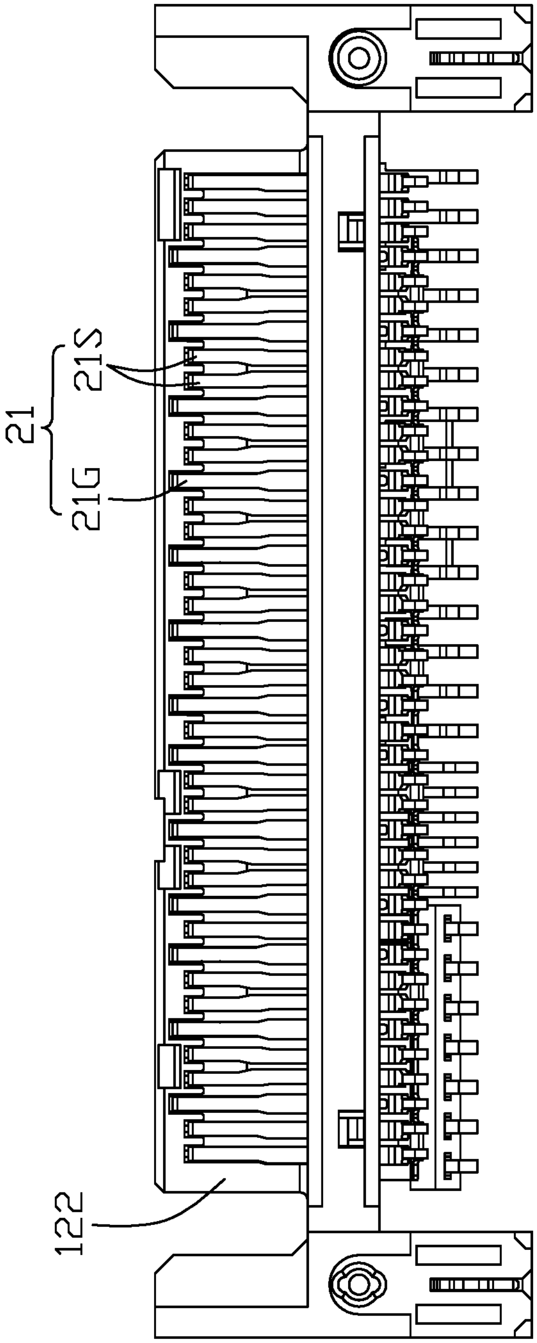
FIG. 6 is a bottom view of the plug connector of FIG. 1.
Figure 7:
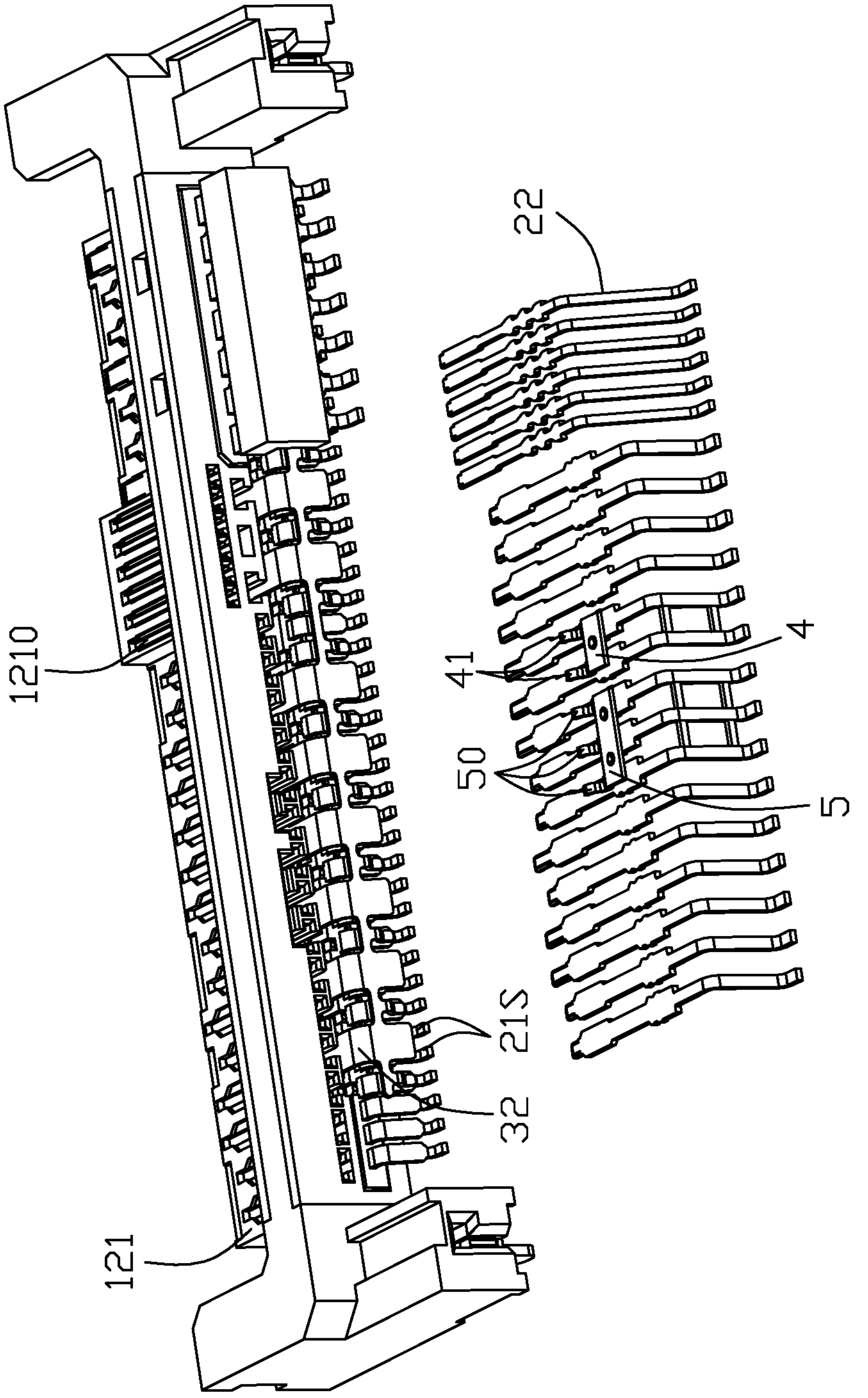
FIG. 7 is an exploded perspective view of the plug connector of FIG. 2, wherein some of the second terminals are separated from the housing.
Figure 8:
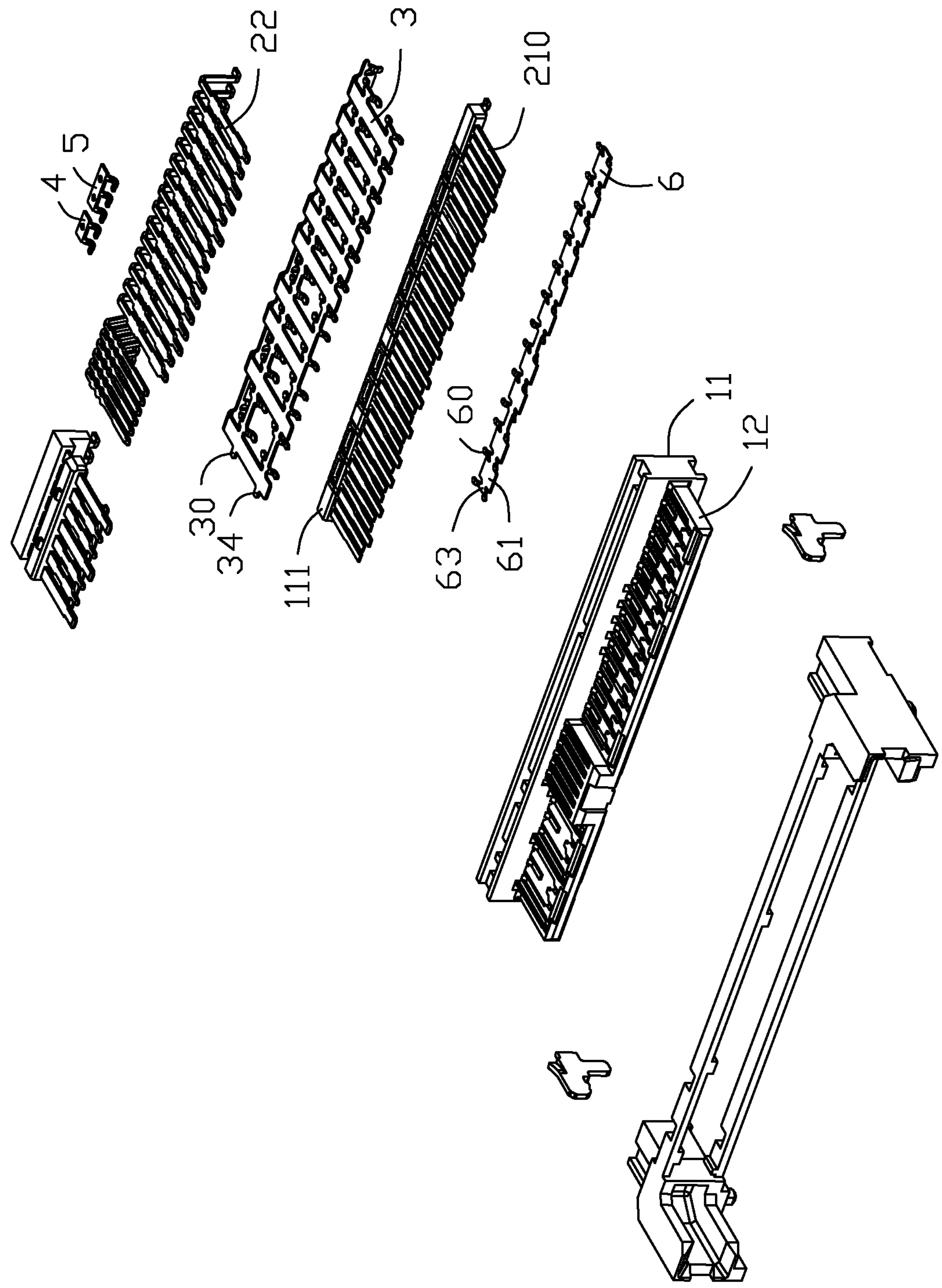
FIG. 8 is a further exploded perspective view of the plug connector of FIG. 7.

Referring to FIGS. 7-8, the plug connector 100 further includes a second grounding member 4 and a third grounding member 5 that are adjacently arranged along the longitudinal direction. The second grounding member 4 includes two grounding tails 41 which contact with two grounding terminals of the second terminals 22 respectively. The third grounding member 5 comprises three grounding tails 50 which contact with three grounding terminals of the second terminal 22 respectively. Referring to FIGS. 3 and 8, the plug connector 100 further comprises a fourth grounding member 6, the first grounding member 3 is at one side of the row of the first terminals 21 near the row of the second terminals 22, that is, the first grounding member 3 is between the row of the first terminals 21 and the row of the second terminals 22. The fourth grounding member 6 including a longitudinal ridge 63, a plurality of grounding tails 60 and a plurality of shielding portions 61, is at one side of the row of the first terminals 21 away from the row of the second terminals 22. The shielding portion 32 of the first grounding member 3 faces to the corresponding shielding portions 61 of the fourth grounding member 6 one to one, so the shielding portion 32 of the first grounding member 3 and the shielding portion 61 of the fourth grounding member 6 are at two different sides of the pair of the signal terminals 21S of the first terminals 21 respectively. The grounding tails 33 of the first grounding member 3 and the grounding tails 60 of the fourth grounding member 6 are at two different sides of the grounding terminals 21G of the first terminals 21, thus, the grounding terminals 21G can be grounded from its two sides by the grounding tails 33 of the first grounding member 3 and the grounding tails 60 of the fourth grounding member 6. Preferably, the fourth grounding member 6 is retained in the base portion 11.

Referring to FIGS. 11-16, the receptacle connector 200 comprises a longitudinal housing 1*a*, a row of first terminals 21*a*, a row of second terminals 22*a* and a first grounding member 3*a* located at one side of the first terminals 21*a*. The housing 1*a* is provided with a mating slot 10, which can be seen clearly in FIG. 2, and two side walls beside the mating slot 10, the row of the first terminals 21*a* is retained in one side wall and the row of the second terminals 22*a* is retained in the other side wall. Similar to the plug connector 100, the first terminals 21*a* are molded into in a first insulating part 111*a* which is a part of the housing 1*a* to form a first terminal module 210 firstly and then the first terminal module 210 is installed into a main part of the housing 1*a*.

Figure 17:
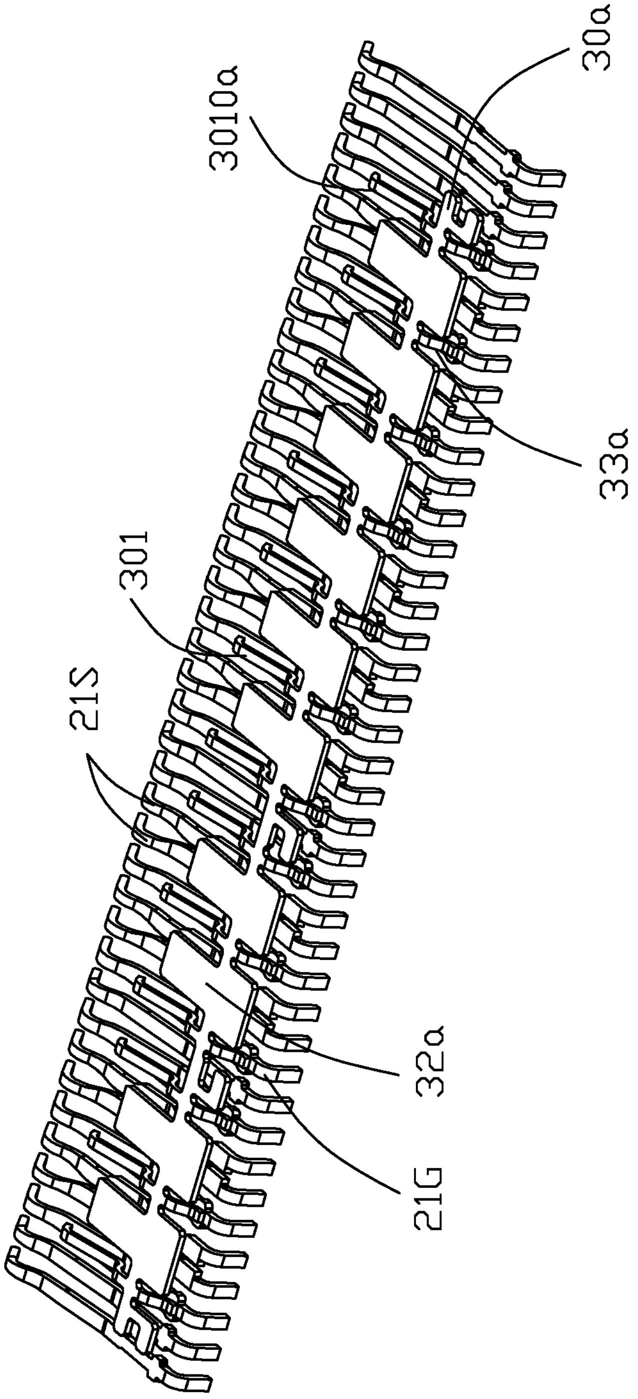
FIG. 17 is a perspective view of the first terminals and the first grounding member thereof of FIG. 15.

Combing with FIG. 3, each of the first terminal 21*a* and the second terminal 22*a* comprises a fixing portion 201*a*, a tail portion 203*a* extending from the fixing portion 201*a* backward and an elastic portion 204*a* extending from the fixing portion 201 forward and going into the mating slot 10, the elastic portion 204*a* has a contacting portion 2010*a* for electrically contacting with the terminals of the plug connector 100. A row of the first terminals 21*a* comprises pairs of signal terminals 21S and a plural of grounding terminals 21G, the first grounding member 3*a* is at a side of the row of first terminals 21*a* toward the mating slot 10, that is, the grounding member 3*a* is between the row of first terminals 21*a* and the mating slot 10. Referring to FIG. 17, similar to the first grounding member 3 of the plug connector 100, the first grounding member 3*a* comprises a longitudinal ridge 30*a*, and plural shielding portions 32*a* and grounding tails 33*a* extending from the ridges 30, each shielding portion 32*a* faces and shields the corresponding pair of signal terminals 21S of the first terminals 21*a*, each grounding tail 33*a* electrically contacts the corresponding grounding terminals 21G of the first terminals 21*a*, the shielding portion 32*a* of the first grounding member 3*a* extends from the ridge 30*a* forward and backward, facing the fixing portion 201*a* and the elastic portion 204*a* near the fixing portion 201*a*. Further combing with FIGS. 3-4, the first grounding member 3*a* further comprises plural elastic arms 301*a* extending forward from the ridge 30*a* and into the mating slot 10, the elastic arm 301*a* has a contact portion 3010*a*, the grounding tail 33*a* extends backward from the ridge 30*a* and to the fixing portion 201*a* near the tail portion 203*a*. So the elastic arm 301*a* and the grounding portion 33*a* locate at the front side and the rear side of the ridge 30*a* respectively.

Referring to FIGS. 12-13 and 15-16, the receptacle connector 200 further comprises a second grounding member 4*a*, a third grounding member 5*a* and a fourth grounding member 6*a*, the second grounding member 4*a* has two grounding tails 41*a* which contact two neighbor second terminals one to one respectively. The third grounding member 5*a* has three grounding tails 50*a* which contact three adjacent second terminals 22*a* one to one respectively.

The grounding terminals of the second terminals contact with the three grounding tails 50*a* of the third grounding member 5*a* and the two grounding tails 41*a* of the second grounding member 4*a*. The fourth grounding member 6*a* has a longitudinal ridge 63*a*, grounding tails 60*a* which extend backward from the longitudinal ridge 63*a* and shielding portions 61*a* extending forward from the longitudinal ridge 63*a* and facing the elastic portions 204*a* away from the fixing portion 201*a*. For a better shielding performance of the signal terminals 21S of the first terminals 21*a*, the shielding portion 32*a* of the first grounding member 3*a* and the shielding portion 61*a* of the fourth grounding member 6 overlap with each other near the fixing portion 201*a* of the first terminal 21*a*. The grounding tail 60*a* extends backward and electrically contacts with the fixing portion 201*a* of the grounding terminals 21G of the first terminal 21*a*. The power contacts of the plug connector 100, that electrically connect with the second grounding member 4 and the third grounding member 5, contact with the power contacts of the mating connector 200 that electrically connect with the second grounding member 4*a* and the third grounding member 5*a* when the plug connector 100 and receptacle connector 200 are mated.

In summary, the electrical connector of the invention can be the plug connector 100 or the receptacle connector 200, the grounding member comprises the grounding tails for contacting with the grounding terminals for mitigating the effects of resonance and the shielding portions for shielding the signal terminals.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising: a longitudinal housing defining a longitudinal direction; a row of first terminals being retained in the housing and comprising plural pairs of signal terminals and plural grounding terminals; a row of second terminals retained in the housing opposite to the row of the first terminals; and a first grounding member retained in the housing; wherein the first grounding member comprises a longitudinal ridge extending in the longitudinal direction, a plurality of shielding portions, and a plurality of grounding tails extending from the longitudinal ridge, the shielding portions face and shield corresponding pairs of signal terminals of the row of first terminals, respectively, spanning from a rear end to a front end of corresponding signal terminals, and the grounding tails contact corresponding grounding terminals of the row of first terminals, respectively; a second grounding member and a third grounding member, wherein the second grounding member has two grounding tails which contact two corresponding grounding terminals of the row of second terminals respectively, and the third grounding member has three grounding tails which contact three corresponding grounding terminals of the row of second terminals respectively.

2. The electrical connector as claimed in claim 1, further comprising a fourth grounding member, wherein the first grounding member is located between the row of first terminals and the row of second terminals, and the fourth grounding member is located at another side of the row of first terminals.

3. The electrical connector as claimed in claim 1, wherein the first grounding member further has a front assistant ridge and a rear assistant ridge parallel to the longitudinal ridge, each of the front and rear assistant ridges has plural grounding tails extending therefrom, and the grounding tails of the longitudinal ridge, the front assistant ridge, and the rear assistant ridge contact different points of a corresponding grounding terminal of the row of first terminals.

4. The electrical connector as claimed in claim 3, wherein all the grounding tails of the longitudinal ridge, the front assistant ridge, and the rear assistant ridge extend in a lengthwise direction of the grounding terminal of the row of first terminals.

5. The electrical connector as claimed in claim 1, wherein the housing comprises a base portion and a tongue portion extending forward from the base portion, each of the first terminal and the second terminal comprises a flat portion and a tail portion, and the flat portions of the first terminals and the second terminals are exposed on opposite faces of the tongue portion respectively.

6. The electrical connector as claimed in claim 5, wherein the tail portion has a connecting portion extending downward from the flat portion and a soldering portion extending horizontally from the connecting portion, the shielding portions of the first grounding member shield the connecting portions from front ends of the flat portion of the signal terminals of the row of first terminals.

7. The electrical connector as claimed in claim 6, wherein the rear assistant ridge faces the connecting portions of the first terminals.

8. The electrical connector as claimed in claim 1, wherein the housing defines a mating slot, the row of first terminals and the row of second terminals are located at opposite sides of the mating slot, and the first grounding member is located between the row of first terminals and the row of second terminals.

* * * * *